(12) United States Patent
Petculescu et al.

(10) Patent No.: US 7,328,206 B2
(45) Date of Patent: Feb. 5, 2008

(54) EXTENSIONS FOR ADDING AND REMOVING CALCULATED MEMBERS IN A MULTIDIMENSIONAL DATABASE

(75) Inventors: Cristian Petculescu, Redmond, WA (US); Amir Netz, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 474 days.

(21) Appl. No.: 10/624,726

(22) Filed: Jul. 23, 2003

(65) Prior Publication Data

US 2004/0059724 A1   Mar. 25, 2004

Related U.S. Application Data

(63) Continuation of application No. 09/419,427, filed on Oct. 15, 1999, now abandoned.

(51) Int. Cl.
*G06F 17/30* (2006.01)

(52) U.S. Cl. ............... 707/3; 707/2; 707/4; 707/104.1; 707/100; 707/10

(58) Field of Classification Search ................ 707/3, 707/10, 100, 102
See application file for complete search history.

(56) References Cited

U.S. PATENT DOCUMENTS

| | | | |
|---|---|---|---|
| 5,475,819 A | 12/1995 | Miller et al. ........... 395/200.03 |
| 5,826,077 A | 10/1998 | Blakeley et al. ............ 395/604 |
| 5,875,446 A | 2/1999 | Brown et al. ................... 707/3 |
| 5,890,151 A | 3/1999 | Agrawal et al. ................ 707/5 |
| 5,940,818 A | 8/1999 | Malloy et al. .................. 707/2 |
| 5,940,822 A | 8/1999 | Haderle et al. ................. 707/3 |
| 6,169,986 B1 * | 1/2001 | Bowman et al. ................ 707/5 |
| 6,178,382 B1 | 1/2001 | Roederer et al. ............ 702/21 |
| 6,205,447 B1 | 3/2001 | Malloy ....................... 707/102 |
| 6,226,647 B1 * | 5/2001 | Venkatasubramanian et al. ........................... 707/102 |
| 6,298,342 B1 * | 10/2001 | Graefe et al. ................... 707/4 |
| 6,363,377 B1 * | 3/2002 | Kravets et al. ................. 707/4 |
| 6,366,904 B1 * | 4/2002 | BenHadda et al. ............ 707/3 |
| 6,366,905 B1 * | 4/2002 | Netz .............................. 707/3 |
| 6,421,677 B1 * | 7/2002 | DeKimpe et al. ........... 707/102 |
| 6,438,537 B1 * | 8/2002 | Netz et al. ..................... 707/3 |
| 6,519,586 B2 * | 2/2003 | Anick et al. ................... 707/3 |
| 6,665,682 B1 * | 12/2003 | DeKimpe et al. ........... 707/101 |

OTHER PUBLICATIONS

Agrawal . et al., "Modeling Multidimensional Databases", *IBM Almaden Research Center*, San Jose, CA, 1-23 , 1995.
"The Evolution of OLAP", *E.F. Codd & Associates*, 1993, 1-20.

* cited by examiner

*Primary Examiner*—Cam Y T Truong
(74) *Attorney, Agent, or Firm*—Woodcock Washburn LLP

(57) ABSTRACT

Systems, clients, servers, methods, and computer-readable media of varying scope are described in which, two extensions for a multidimensional database query language extensions, AddCalculatedMembers and StripCalculatedMembers, allow an OLAP client to easily control the integration of calculated members into the results of OLAP database queries. The OLAP client need not be aware of the details of which calculated members are defined within the multidimensional database and need not explicitly request the inclusion or removal of each calculate member from the output data set of the query.

9 Claims, 4 Drawing Sheets

EXTENSIONS FOR ADDING AND REMOVING CALCULATED MEMBERS IN A MULTIDIMENSIONAL DATABASE

This application is a continuation of Ser. No. 09/419,427 filed on Oct. 15, 1999 now abandoned. A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 1999, Microsoft, Inc.

FIELD

The present invention pertains generally to computer-implemented databases, and more particularly to database extensions for automatically including and removing calculated members form a data set of such databases.

BACKGROUND

Online analytical processing (OLAP) is a key part of most data warehouse and business analysis systems. OLAP services provide for fast analysis of multidimensional information. For this purpose, OLAP services provide for multidimensional access and navigation of data in an intuitive and natural way, providing a global view of data that can be drilled down into particular data of interest. Speed and response time are important attributes of OLAP services that allow users to browse and analyze data online in an efficient manner. Furthermore, OLAP services typically provide analytical tools to rank, aggregate, and calculate lead and lag indicators for the data under analysis.

An OLAP server is a high-capacity, multi-user data manipulation engine specifically designed to support and operate on multi-dimensional data structures. A multi-dimensional structure is arranged so that every data item is located and accessed based on the intersection of the dimension members which define that item. The design of the server and the structure of the data are optimized for rapid ad-hoc information retrieval in any orientation, as well as for fast, flexible calculation and transformation of raw data based on formulaic relationships.

A fundamental entity that is present in typical OLAP databases is a cube. A cube is a multidimensional representation of a set of data having varying aspects. A cube comprises a set of dimensions and a set of measures. In this context, a dimension is a structural attribute of the cube that is a list of members of a similar type in the user's perception of the data. Typically, there is a hierarchy associated with the dimension. For example, a time dimension can consist of days, weeks, months, and years, while a geography dimension can consist of cities, states/provinces, and countries. Dimension members act as indices for identifying a particular cell or range of cells within a multidimensional array. A measure is a structural attribute of the cube that comprises a particular type of value that provides detail data for particular members within the dimensions. For example, sale amounts and units sold can be measures of a retail cube having a time dimension and a geography dimension. The measures provide the sale amounts and units sold for a particular geographic region at a particular point in time. For example, consider the following query:

```
select
    time.members on columns,
    geography.members on rows,
from sales.
```

In this query, time and geography are dimensions of the underlying database while sales is a measure. Conventional OLAP databases return a data set that does not include any calculated members that are within the range of the data set.

A calculated member is a member of a dimension whose value is determined from other members' values (e.g., by application of a mathematical or logical operation). Calculated members may be part of the OLAP server database or may have been specified by the user during an interactive session. This allows the user to customize the dimension tree by combining cube data, arithmetic operations, numbers and/or functions.

One deficiency in conventional OLAP databases, and the corresponding query language, is that a query typically returns a data set that does not include the calculated members unless the query explicitly requests the calculated members. As such, the user is forced to access the database, determine which calculated members are defined and explicitly request their inclusion in the data set. Thus there is a need in the art for general-purpose, yet powerful technique for the end-user to control the manner in which calculated members are integrated in database queries without requiring detailed knowledge of the underlying database and the existing calculated members.

SUMMARY

The above-mentioned shortcomings, disadvantages and problems are addressed by the present invention, which will be understood by reading and studying the following specification. Systems, clients, servers, methods, and computer-readable media of varying scope are described in which, two extensions for a multidimensional database query language extensions, AddCalculatedMembers and StripCalculatedMembers, allow an OLAP client to easily control the integration of calculated members into the results of OLAP database queries. The OLAP client need not be aware of the details of which calculated members are defined within the multidimensional database and need not explicitly request the inclusion or removal of each calculate member from the output data set of the query.

According to the AddCalculatedMembers extension, the OLAP server processes a database query by determining a hierarchical context for each member of an input data set specified by the query. The OLAP server includes in the processing of the query each non-calculated member specified by the input data set and any calculated members of the database that are within the hierarchical context of at least one of the members of the input data set.

According to the StripCalculatedMembers extension, the OLAP server processes a database query by determining whether the query includes an extension directing the OLAP server to automatically exclude calculated members of an input data set. Based on the determination, the OLAP server processes the query using only the non-calculated members specified by the input data set.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into four sections. In the first section, the hardware and the operating environment in conjunction with which embodiments of the invention may be practiced are described. In the second section, a system level overview of the invention is presented. In the third section, methods of an exemplary embodiment of the invention are provided. Finally, in the fourth section, a conclusion of the detailed description is provided.

Hardware and Operating Environment

Figure 1:
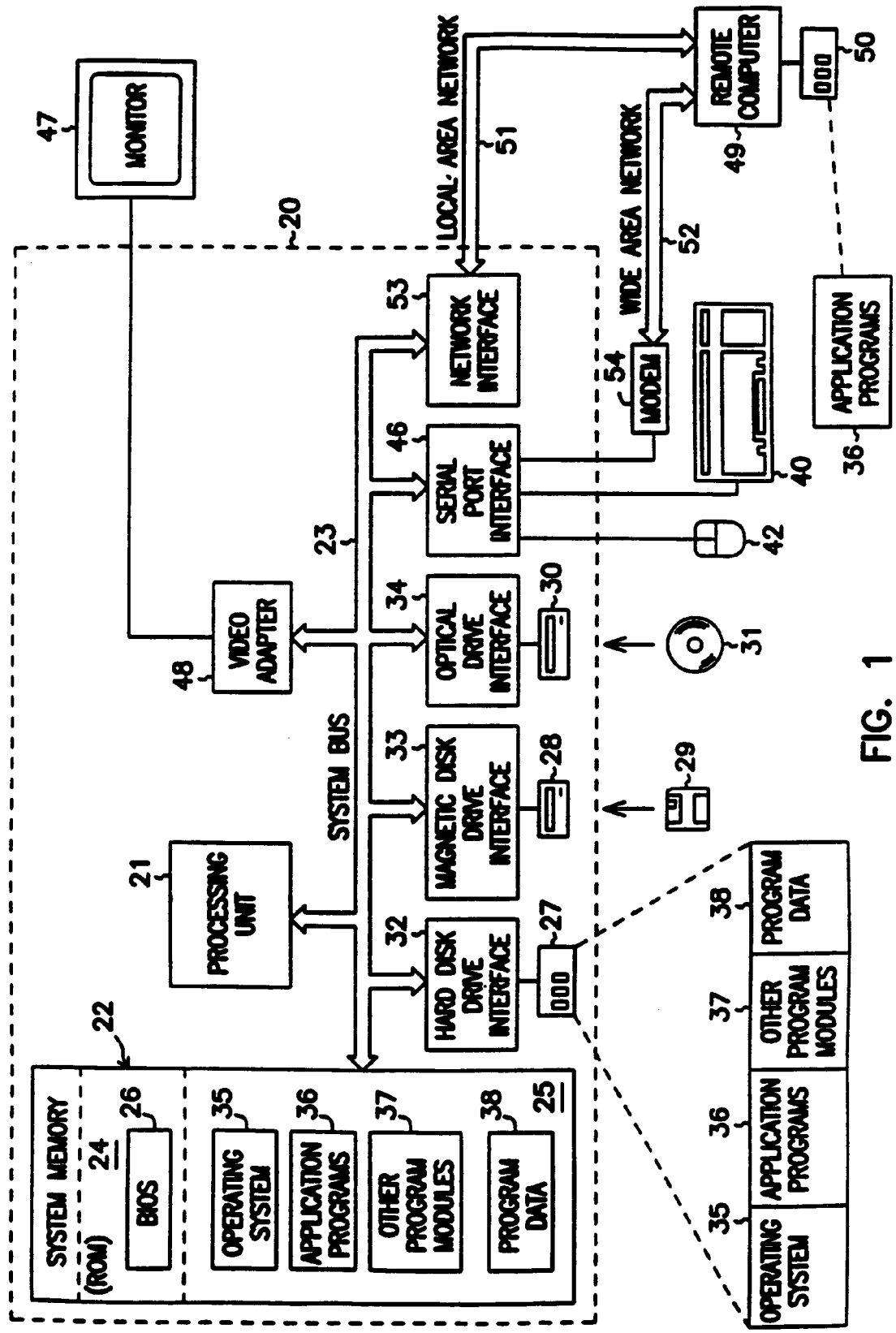
FIG. 1 shows a diagram of the hardware and operating environment in conjunction with which embodiments of the invention may be practiced.

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc. that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System Level Overview

Figure 2:
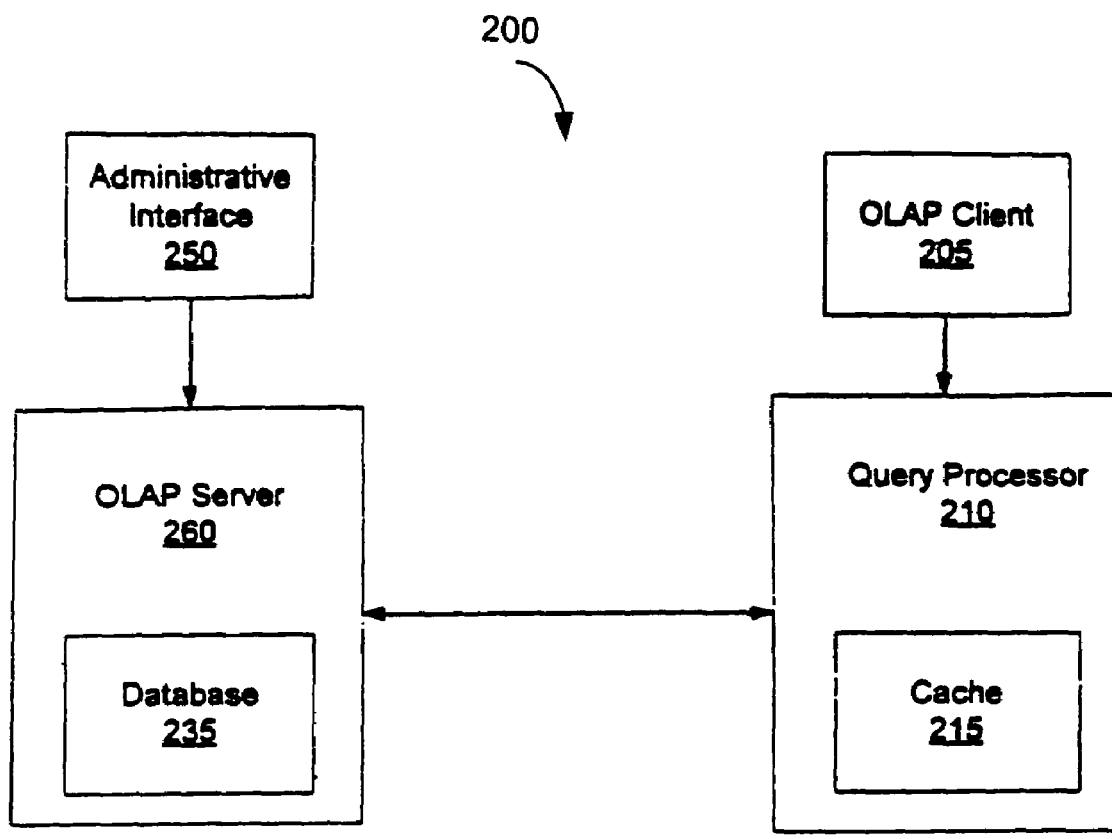
FIG. 2 is a block diagram illustrating a multidimensional database processing systems incorporating the present invention.

FIG. 2 is a block diagram illustrating a multidimensional database processing systems 200 incorporating the present invention. The concepts of the invention are described as operating in a distributed, multiprocessing, multithreaded operating environment provided by one or more computers, such as computer 20 in FIG. 1. The operating environment includes OLAP client 205, Query Processor 210, OLAP server 260 and administrative interface 250 which represent software modules executing on one or more of such computers.

OLAP Server 260 maintains and/or provides OLAP services to one or more clients, such as OLAP client 205. In one embodiment of the invention, the OLAP server 260 is a version of the SQL Server OLAP Services product from Microsoft Corporation. However, the invention is not limited to any particular OLAP server product, as those of skill in the art will appreciate. Administrative interface 250 is an application that provides a user interface for configuring and defining entities and attributes in OLAP server 260. For example, administrative interface 250 provides an interface for selecting the dimensions, levels, and measures for data cubes.

OLAP client 205 is an application program that requires the services of an OLAP system. OLAP client 205 can be any type of application that interacts with the OLAP system, for example, a data mining application, a data warehousing application, a data analysis application, a reporting application etc. OLAP client 205 typically interacts with OLAP system 260 by issuing OLAP queries. In one embodiment of the invention, queries are submitted to a query processor component 210 of the client application 205. The query processor component parses, binds and executes the received query. In one embodiment of the invention, query processor 210 includes a local cache 215. In this embodiment query processor 210 determines whether requested data cells have been previously cached in a local cache 215. If so, the cell data is returned to the client from the cache, eliminating the time and resource expense required to obtain the cell data from the OLAP server 260. If the cell data is not currently in the local cache 215 then query processor 210 requests the cell data from the OLAP server 260. Upon receipt, query processor 210 returns the cell data to the client application 205. In addition, the newly received cell data is cached in local cache 215 for potential later use.

In one embodiment of the invention, OLAP server includes database 235 that represents data stored in a relational format on a persistent storage device such as hard disk drive 27 of FIG. 1. Examples of such databases include, but are not limited to SQL Server, Oracle, Sybase, Informix etc. Other database formats are also readily suitable to the concepts of the invention such as storing the data in a flat file format. Database 235 is a multidimensional database having dimensions and measures as described above. The members of a given dimension defined within database 235 may be organized and illustrated in a hierarchical fashion based on parent-child relationships, where a parent member represents the consolidation of the members which are its children. This organization is often referred to as a dimension tree where the "leafs" correspond to the most detailed data in that dimension and inner nodes correspond to levels of aggregated data. The most aggregated data, i.e. the top level, is referred to as the root, which contains the aggregate of all leafs. Each member of a particular dimension has a "hierarchical context" and a "maximal hierarchical context. More specifically, the 'hierarchical context' $HC_S(m)$ of member m in set S is the contiguous subset of S, starting with m and continuing in consecutive order through all the descendants of m in S. A 'maximal' hierarchical context $\underline{HC}_S(m)$ if there is no m' in S such that $HC_S(m')$ is included in $HC_S(m)$. Using the symbol Σ to denote the set juxtaposition operator, which builds the juxtaposition of the members of a number of sets, $S=\Sigma \underline{HC}_S(m)$. Because the HCs are defined as mathematical trees, set S is thus a forest.

Figure 3:
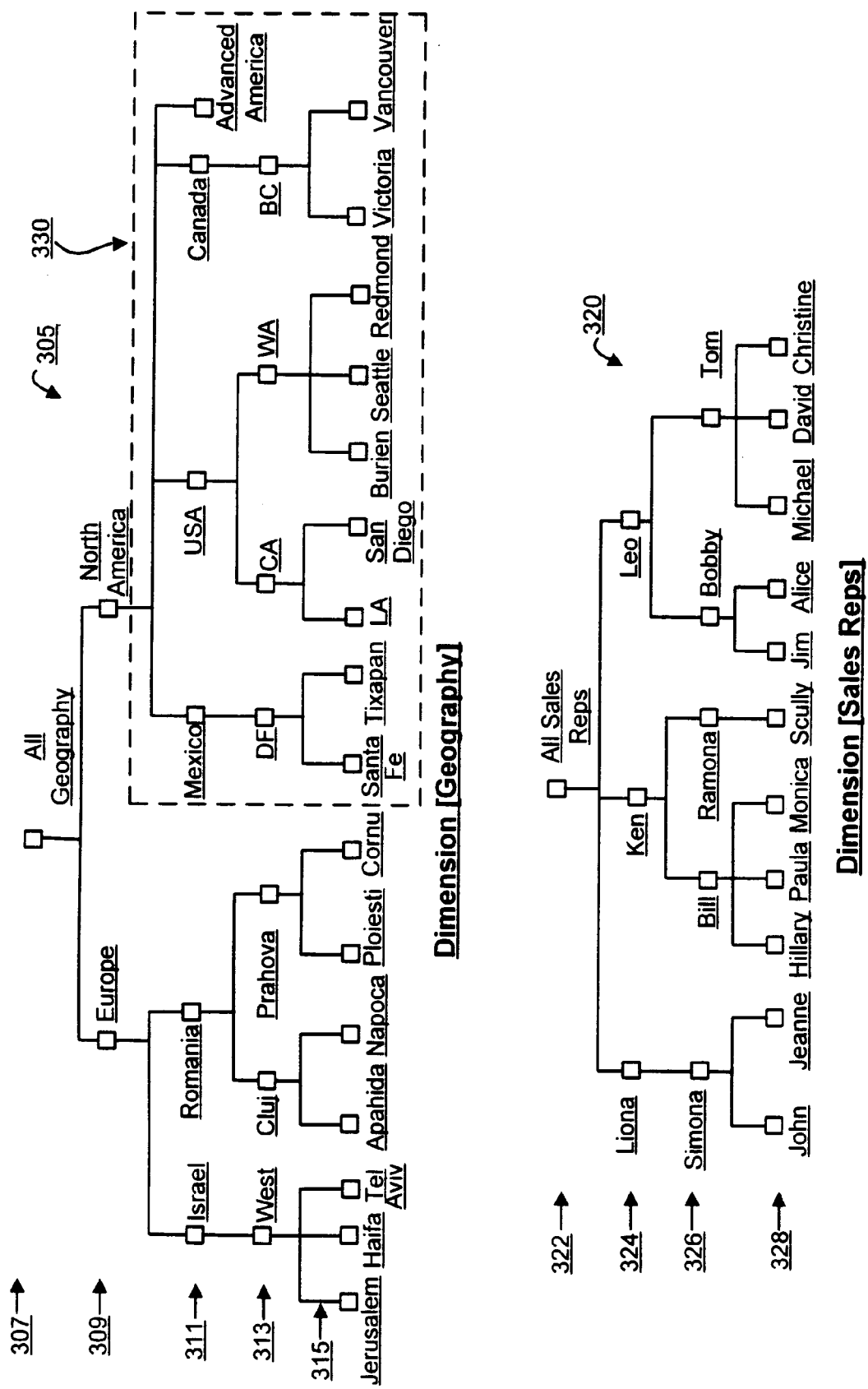
FIG. 3 is a block diagram illustrating the two dimensions as hierarchical parent-child trees.

To further illustrate these concepts, consider a data cube that holds sales information and includes: (1) geography and sales representatives as dimensions, and (2) net sales and volume are measures. In this fashion, the combination of a particular measure (e.g. Sales) with a particular representative member and a particular geography member specify a data cell having a value that represents unit sales. FIG. 3 is a block diagram illustrating the two dimensions as hierarchical parent-child trees. As illustrated in FIG. 3, the geography dimension 305 has five levels: All 307, Region 309, Country 311, Province 313 and City 315. Sales dimension 320 has four levels: All 222, Top Level Manager 224, Lower Level Manager 226 and Sales Representative 228. The Geography dimension also includes a calculated member, Advanced America, that, for exemplary purposes, is defined as the sum of the data aggregated within USA and Canada. The maximal hierarchical context of Mexico is sub-hierarchy 330 of the Geography dimension 305 that includes Mexico, Mexico's descendants, siblings USA and Canada and their descendants.

In order to view a particular portion of data encapsulated via the data cube, OLAP client 205 submits a query to query processor 210. For example, OLAP client 205 may request sales information for North America for all sales representatives by issuing the following query:

```
select
    {ken, ramona, bill, leo, tom} on columns,
    {[North America], [North America] .children} on rows
from sales.
```

Query processor 210 parses the query, examines local cache 215 and, if necessary, submits the query to OLAP server 260. Table 3 below represents typical results returned by conventional OLAP systems for such a query:

TABLE 3

| SALES | Ken | Ramona | Bill | Leo | Tom |
|---|---|---|---|---|---|
| North America | 20000 | 94000 | 10600 | 12000 | 7000 |
| Canada | 7000 | 3400 | 3600 | 5000 | 2000 |
| Mexico | 3000 | 2000 | 1000 | 3000 | 2000 |
| USA | 10000 | 4000 | 6000 | 4000 | 3000 |

As illustrated in Table 3, the member Advanced North America is not included in the report because it is a calculated member. In conventional systems, OLAP client 205 would need to explicitly request that the Advanced North America member be added. According to the invention, however, such explicit requests are not necessary. More specifically, data processing system 300 recognizes and processes two new query extensions that inform OLAP server 260 to include or exclude calculated members without requiring OLAP client 205 explicitly recite the calculated members. These extensions are AddCalculatedMembers and StripCalculatedMembers and in one embodiment conform to the following syntax:

```
<result set> := AddCalculatedMembers (<input data set>)
<result set> := StripCalculatedMembers (<input data set>)
```

According to the above definitions, each function receives a one-dimensional input data set and produces a one-dimensional result data set. The AddCalculatedMembers extension directs OLAP server 260 to produce the output data set to include calculate members within the output database. OLAP server 260 selectively includes calculated members of database 235 as a function of the maximal hierarchical context of the corresponding calculated member in relation to the members of the input data set. As described in detail below, OLAP server 260 includes a particular calculated member in the output data set if the calculated member falls within the hierarchical context of a non-calculated member within the output data set. The StripCalculatedMembers extension directs OLAP server 260 to examine each member of the input data set and remove the member if it is a calculated member.

To further illustrate the invention, consider the following query that includes the AddCalculatedMembers extension:

```
select
    AddCalculatedMembers (ken, ramona, bill, leo, tom) on columns,
    AddCalculatedMembers ({[North America], [North America] .children}) on rows,
from sales.
```

Here, OLAP client 205 is requesting sales information for North America for all sales representatives but directs OLAP server 260 to automatically include any calculated member. During the processing, OLAP server 206 determines that the calculated member Advanced America falls within the hierarchical context of non-calculated members within the output data set, namely, Mexico and USA and, therefore, adds Advanced America to the output data set. Table 4 below represents the results returned by OLAP server 206 for such a query having the inventive AddCalculatedMember extension:

TABLE 4

| SALES | Ken | Ramona | Bill | Leo | Tom |
|---|---|---|---|---|---|
| North America | 20000 | 94000 | 10600 | 12000 | 7000 |
| Canada | 7000 | 3400 | 3600 | 5000 | 2000 |
| Mexico | 3000 | 2000 | 1000 | 3000 | 2000 |
| USA | 10000 | 4000 | 6000 | 4000 | 3000 |
| Advanced America | 17000 | 7400 | 9600 | 9000 | 5000 |

A system level overview has been described in which a multidimensional database processing systems 200 incorporates the present invention. According to the invention, two query language extensions, AddCalculatedMembers and StripCalculatedMembers, allow OLAP client 205 to easily control the integration of calculated members into the results of OLAP database queries. Furthermore, OLAP client 205 need not be aware of the details of which calculated members are defined within database 235 and need not explicitly request the inclusion or removal of each calculate member from the output data set of the query.

Methods of an Exemplary Embodiment of the Invention

In the previous section, a system level overview of the operation of an exemplary embodiment of the invention was described. In this section, the particular methods of the invention performed by an operating environment executing an exemplary embodiment are described by reference to a series of flowcharts shown in FIGS. 4 and 5. The methods to be performed by the operating environment constitute computer programs made up of computer-executable instructions. Describing the methods by reference to a flowchart enables one skilled in the art to develop such programs including such instructions to carry out the methods on suitable computers (the processor of the computer executing the instructions from computer-readable media). The methods illustrated in FIGS. 4 and 5 are inclusive of the acts required to be taken by an operating environment executing an exemplary embodiment of the invention.

Figure 4:
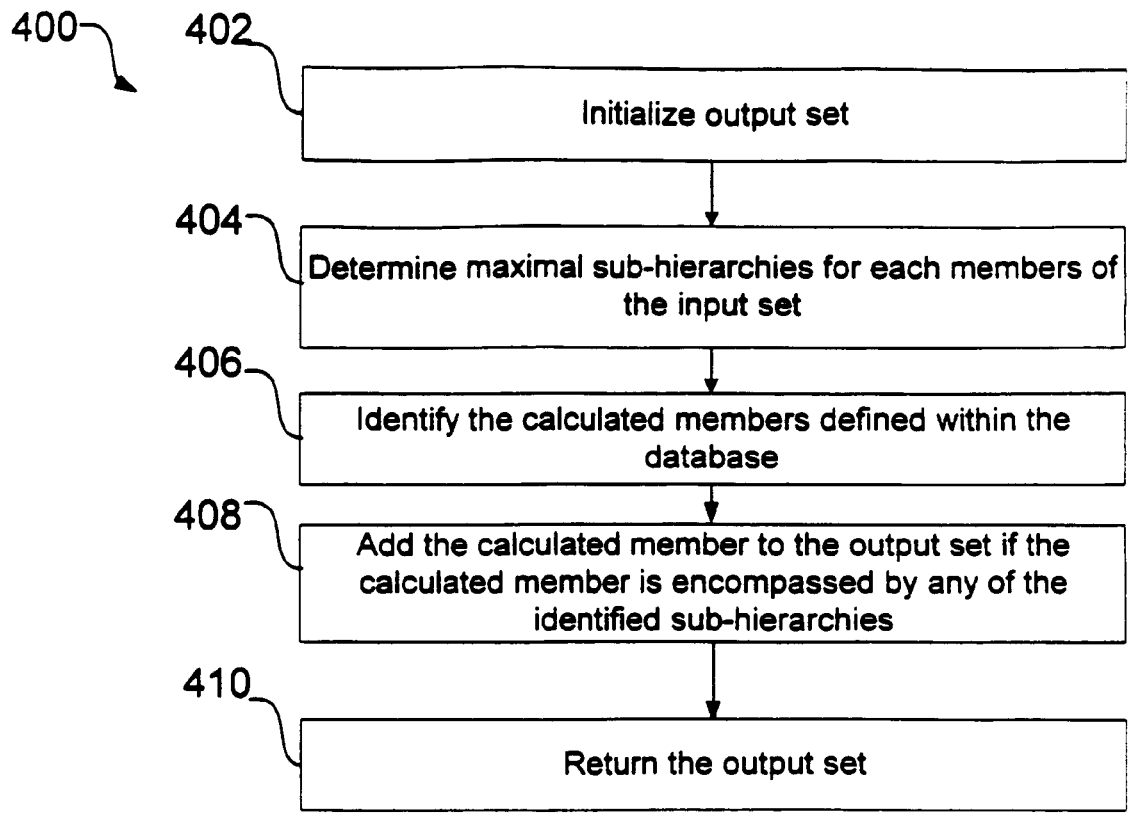
FIG. 4 is a flow chart illustrating one method of operation by which the multidimensional database system implements the AddCalculatedMembers extension.
Figure 5:
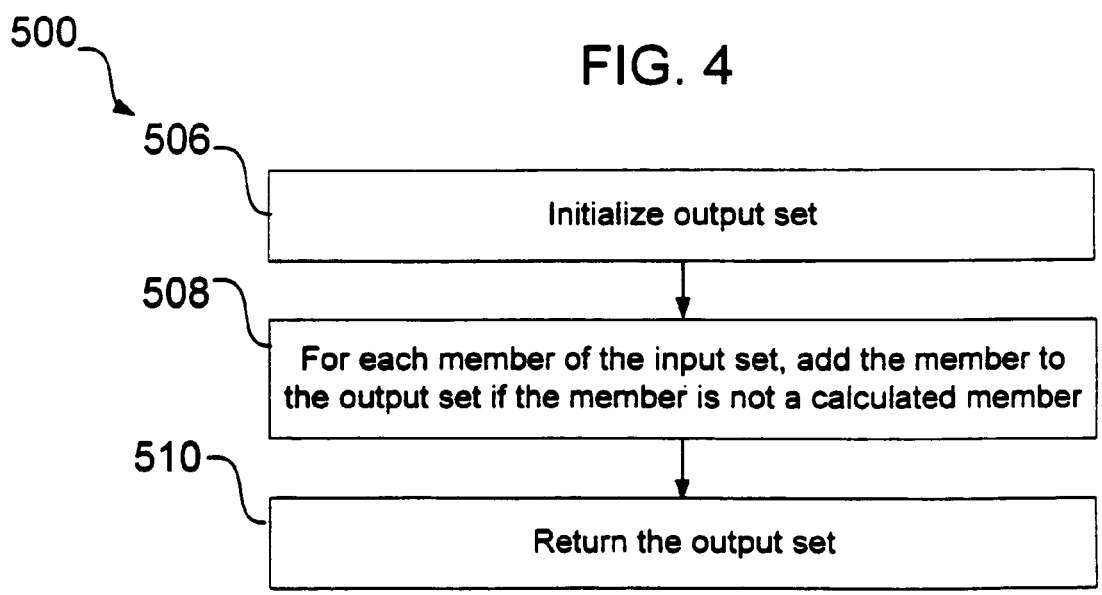
FIG. 5 is a flow chart illustrating one method of operation by which the multidimensional database system implements the StripCalculatedMembers extension.

FIG. 4 is a flow chart 400 illustrating one method of operation by which multidimensional database system 200 implements the AddCalculatedMembers extension. More specifically, FIG. 4 illustrates one embodiment in which database system 200 processes a query and generates an output data set that automatically includes calculated members of database 235 as a function of an input data set. In block 402, OLAP server 260 of database system 200 receives a query from query processor 210 that includes the AddCalculatedMembers extension. OLAP server 260 initializes an output data set by setting the output data set to an empty data set such that the output data set contains no members. Next, OLAP server 260 copies the input data set to the output data set such that each member within the input data set is copied into the output data set.

In block 404, OLAP server 260 examines each member of the input data set and determines the maximal hierarchical context for each member of the input data set. As described above, the maximal hierarchical context represents the sub-hierarchy of the dimension that contains the particular member of the input data set. Thus, in block 404 OLAP server 260 identifies a set of sub-hierarchies within the dimension.

In block 406 OLAP server 260 identifies any calculated member within database 235 that falls within at least one of the maximal hierarchical contexts (sub-hierarchies) identified in block 404. Any identified calculated member within such context is added to the output data set in block 408. For example, if the input data set includes Mexico of FIG. 3 then the calculated member Advanced America is added to the output data set because Advanced America falls within the hierarchical context of Mexico. Once the output data set is generated, OLAP server 260 returns the outputs set (block 410) and processes the query according to the members of within the output data set. For example, as described above, Table 4 represents results returned by OLAP server 260 for such a query having the inventive AddCalculatedMember extensions in which the calculated member Advanced America is automatically included in the resultant data.

FIG. 5 is a flow chart 500 illustrating one method of operation by which multidimensional database system 200 implements the StripCalculatedMembers extension. More specifically, FIG. 5 illustrates one embodiment in which database system 200 processes a query and generates an output data set that automatically excludes calculated members of database 235. In block 502, OLAP server 260 of database system 200 receives a query from query processor 210 that includes the StripCalculatedMembers extension. OLAP server 260 initializes an output data set to an empty set such that the output contains no members.

In block 506, OLAP server 260 examines each member of the input data set and determines whether the member is a calculated member or a non-calculated member. In block 508, OLAP server 260 copies each non-calculated member from the input data set to the output. Once the output data set is generated, OLAP server 260 returns the outputs set (block 510) and processes the query according to the members of within the output data set.

CONCLUSION

Various embodiments of a multidimensional database system have been described in which an OLAP server is easily directed to automatically include or exclude calculated members while processing a query. For example, by simply specifying AddCalculatedMembers during a query, an OLAP client is able to direct the OLAP server to include any calculated members encompassed by the hierarchical context of the dimensions used in the query. Similarly, by specifying StripCalculatedMembers during a query, an OLAP client is able to direct the OLAP server to automatically exclude calculated members encompassed from one or more of the data sets used while processing the query. It is intended that only the claims and equivalents thereof limit this invention.

We claim:

1. A computerized system for processing a database query directed to a multidimensional database comprising:
    a processor and a computer-readable medium;
    an operating environment executing on the processor from the computer-readable medium;
    an On Line Analytical Processing (OLAP) server executing within the operating environment and maintaining the multidimensional database, wherein the OLAP server processes the database query by determining a subset of the database for each member of an input data set specified by the query;
    including in the processing of the query any calculated members of the database that are within at least one of subsets of the database, without the query specifying any calculated members of the database;
    the OLAP server generates an output data set to include any of the calculated members of the database;
    the OLAP server processes a query directive of a query extension that directs calculated members to be excluded from an output of the query, resulting in processing the query using non-calculated members specified by the input data set; and
    in a situation when the OLAP server processes said query directive of exclusion, the OLAP server initializes an output data set to an empty set, copies the non-calculated members of the input data set to the output data set, and processes the query using the output data set.

2. The computerized system of claim 1, wherein the OLAP server receives the query from an OLAP client application via a query processor.

3. The computerized system of claim 1, wherein for each member of the input data set the OLAP server identifies, within a dimension of the database, each member's siblings, member's descendants and descendants of the siblings.

4. The computerized system of claim 1, wherein the database is a relational database system.

5. A computerized system for processing a database query directed to a multidimensional database comprising:
    a processor and a computer-readable medium;
    an operating environment executing on the processor from the computer-readable medium;
    an On Line Analytical Processing (OLAP) server executing within the operating environment and maintaining the multidimensional database, wherein the OLAP server processes the database query by determining whether the query includes an extension directing the OLAP server to automatically exclude calculated members of an input data set; wherein processing the query includes generating an output data set based on the determination;
    when a query directive of the query extension is identified that directs that calculated members be excluded from output of the query, processing the query using non-calculated members specified by the input data set; and
    the OLAP server initializing an output data set to an empty set, copies the non-calculated members of the input data set to the output data set, and processes the query using the output data set.

6. The computerized system of claim 5, wherein the OLAP server receives the query from an OLAP client application via a query processor.

7. The computerized system of claim 5, wherein the database is a relational database system.

8. A computerized method for processing a received query directed to a multidimensional database comprising:

parsing the received query to identify whether the query contains a query extension that indicates specifically how calculated members are to be handled in processing the query;

when a query directive of the query extension is identified that directs calculated members be excluded from output of the query, processing the query using non-calculated members specified by an input data set;

when the query directive of the query extension is identified that directs that calculated members be included in the output of the query then performing at least the steps of:

determining a subset of the database for each member of an input data set specified by the query;

processing the query using any calculated members of the database that are within at least one of subsets of the database, without the query specifying any calculated members of the database;

wherein the processing the query includes generating an output data set based on the directive of the query extension; and the processing the query includes processing the query with an On Line Analytical Processing (OLAP) server.

9. A computerized method for processing a received query directed to a multidimensional database comprising:

parsing the received query to identify whether the query contains a query extension that indicates specifically how calculated members is handled in processing the query;

when a query directive of the query extension is identified that directs calculated members be excluded from an output of the query, processing the query using non-calculated members specified by an input data set;

when a query directive of the query extension is identified that directs calculated members be included in the output of the query then performing at least the steps of:

determining a subset of the database for each member of an input data set specified by the query;

processing the query using any calculated members of the database that is within at least one of subsets of the database, without the query specifying any calculated members of the database;

the processing the query includes generating an output data set based on the directive of the query extension; and the determining a subset for each member includes identifying within a dimension of the database each member's siblings, member's descendants and descendants of the siblings.

* * * * *